July 21, 1959 P. W. NEBEL 2,896,183
POTENTIOMETER
Filed July 5, 1956

INVENTOR.
PAUL W. NEBEL
BY Robert S Craig
ATTORNEY

United States Patent Office 2,896,183
Patented July 21, 1959

2,896,183

POTENTIOMETER

Paul W. Nebel, Braham, Minn., assignor to Minneapolis-Honeywell Regulator Company, Minneapolis, Minn., a corporation of Delaware Application July 5, 1956, Serial No. 595,976

9 Claims. (Cl. 338—91)

This invention relates to potentiometers and more particularly to a cam characterized potentiometer in which the movement of the wiper arm may be a nonlinear function of the rotatable shaft's angular position.

The purpose of this invention is to provide a potentiometer in which angular movement of the wiper arm can be any desired function of the angular movement of the actuating shaft.

Potentiometers are quite generally used to provide a variable voltage output which is a function of the movement of a rotatable shaft. Many applications of potentiometers require that the output voltage be nonlinear in nature so that equal increments of shaft rotation produce unequal increments of voltage output.

According to my invention, a cam member is affixed to a shaft and rotates therewith. A cam follower travels along the surface of the cam member and transfers the motion of the cam member to a gear sector on which the cam follower is attached. The gear sector oscillates around a post having an axis which is parallel to but displaced from the axis of rotation of the cam member. The gear sector coacts with a pinion which rotates about the same shaft upon which the cam member is affixed. A wiper arm is fastened to the pinion and incorporates a contact member which in turn cooperates with an elongated arcuate resistance element to provide electrical continuity between the resistance element and the wiper arm. It can be seen that motion of the wiper arm is proportional to the rotation of the gear sector and that the rotation of the gear sector depends upon the characterization of the cam member. Consequently, angular motion of the wiper arm can be any desired function of the angular motion of the shaft depending on the characterization of the cam member.

Therefore, an object of my invention is to provide an improved potentiometer structure that may be designed to produce wiper arm movement which is any desired function of shaft rotation.

Further objects of my invention will become clear upon inspection of the drawings, specifications and claims included herein.

Figure 1:
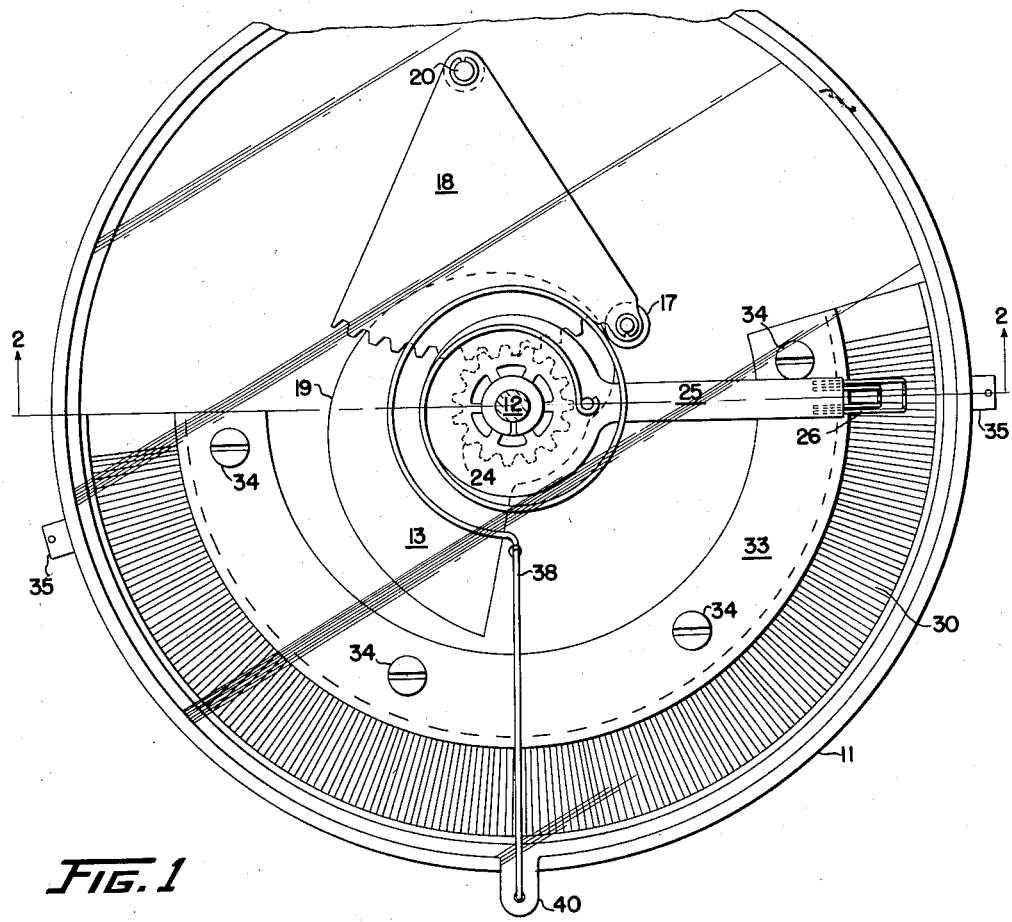
Figure 1 is a plan view of an embodiment of my invention.
Figure 2:
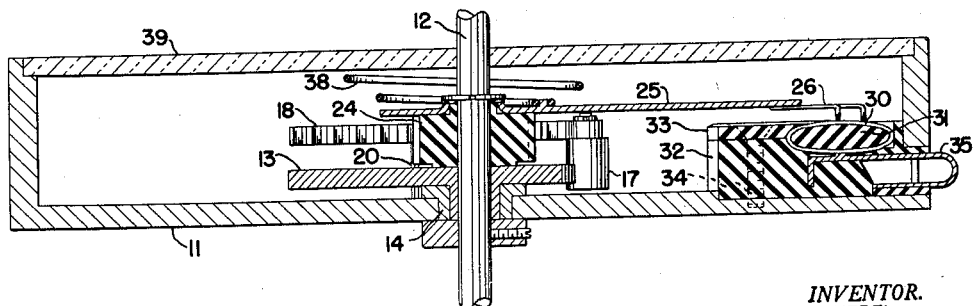
Figure 2 is an elevation of the embodiment of my invention taken along line 2—2 of Figure 1.

In the drawings a casing 11 has a central aperture through which a shaft 12 extends. A cam member 13 is journaled in casing 11 through a bearing 14 and is integrally attached to the shaft 12 being rotatable therewith.

A cam follower 17 is pivotally connected to a gear sector 18 and cooperates with a cam surface 19 of the cam member 13. Gear sector 18 is rotatably attached to a post 20 in the casing 11 and oscillates around the post 20 on an axis which is parallel to, but displaced from the axis of rotation of the cam member 13 and the shaft 12.

A pinion 24 is rotatably carried on the shaft 12 and is angularly positioned by the gear sector 18. A wiper arm 25 is affixed to the pinion 24 with which it rotates and has a contact member 26 at its outer extremity. The contact member 26 cooperates with a resistance element 30 to provide electrical continuity between the resistance element 30 and the wiper arm 25. The resistance element 30 is wound around a bobbin 31 and is held in place in the casing 11 by an insulator 32 and an insulator 33 which are secured by screws 34. Movable taps 35 are mounted in the casing 11 and cooperate with the resistance element 30 to provide electrical contact.

A hair spring 38 is attached to the wiper arm 25 and is wound around the shaft 12 and through an insulating plate 39 which serves as a cover for the casing 11. The hair spring 38 terminates at a tap 40 at the outer edge of the casing 11 and has the dual purpose of providing electrical continuity between the wiper arm 25 and the tap 40 and of applying a counterclockwise force to the pinion 24, as viewed in Figure 1, to force the cam follower 17 against the cam surface 19.

It is evident from the above described structure that a rotation of shaft 12 will be accompanied by an identical rotation of cam member 13 which in turn moves cam follower 17 causing rotation of gear sector 18 about post 20. The rotation of gear sector 18 produces proportional rotation of the pinion 24, the wiper arm 25 and the contact member 26. The result is that angular motion of the shaft 12 produces angular motion of the wiper arm 25 which is a function of the characterization of the cam member 13.

The windings of the resistance element have been shown arcuate and linear, but other geometric forms may be utilized. Likewise other forms of electrical contacting or current controlling means may be substituted for the resistance winding without departing from the scope of the invention. It will also be understood that movement of the shaft in certain ranges may result in no movement of the wiper or even reversal thereof, depending on the shape of the cam. It should also be noted that devices of the type described are easily adapted to be stacked one on another using a single common shaft.

Modifications apparent to those skilled in the art may be substituted without changing the spirit of my invention which is to be limited only as described in the following claims.

I claim as my invention:

1. In a device of the type described, a casing, a rotatable shaft centrally positioned in said casing, a resistance member in said casing arcuately disposed about said shaft, a wiper arm rotatably mounted on said shaft, a contact member on said wiper arm in cooperation with said resistance member, a pinion attached to said wiper arm and rotatably mounted on said shaft, a gear sector pivoted in said casing on an axis parallel to and removed from the pivotal axis of said shaft, the teeth on said gear sector in cooperation with the teeth on said pinion, a cam member integrally attached to said shaft and rotatable by said shaft, a cam follower on said gear sector in cooperation with and positioned by said cam member, and a spring means attached to said casing biasing said wiper arm for rotational movement such that said pinion biases said gear sector for rotational movement with said cam follower biased into cooperation with said cam, rotation of said shaft effecting rotation of said wiper arm through said cam, cam follower, gear sector and pinion.

2. In a device of the type described, a casing, a rotatable shaft centrally positioned in said casing, a resistance member in said casing arcuately disposed about said shaft, a wiper arm rotatably mounted on said shaft, a contact member on said wiper arm in cooperation with said resistance member, a pinion attached to said wiper arm and rotatably mounted on said shaft, a gear sector pivoted in said casing on an axis parallel to and removed from the pivotal axis of said shaft, the teeth on said gear sector being in cooperation with the teeth on said pinion, a cam member integrally attached to said shaft and rotatable by said shaft, and a cam follower on said gear sector in cooperation with and positioned by said cam member, rotation of said shaft effecting rotation of said wiper arm.

3. In a device of the type described, a rotatable shaft, an elongated resistance member, a wiper arm in cooperation with said resistance member rotatable about the same pivotal axis as said shaft, a pinion attached to said wiper arm, a gear sector pivoted on an axis parallel to and removed from the pivotal axis of said shaft and cooperating with said pinion, a cam surface, a cam follower on said gear sector in engagement with and positioned by said cam and means connected to said shaft to produce relative movement between said cam surface and said cam follower, rotation of said shaft normally effecting rotation of said wiper arm.

4. In a device of the type described, a casing, a rotatable shaft positioned in said casing, a resistance member in said casing arcuately disposed about said shaft, a wiper arm in said casing rotatable about the same pivotal axis as said shaft, a contact member on said wiper arm in cooperation with said resistance member, a pinion attached to said wiper arm rotatable about the same axis as said shaft, a gear sector pivotally mounted on an axis parallel to and removed from the pivotal axis of said shaft and cooperating with said pinion, a cam surface, a cam follower on said gear sector cooperating with and positioned by said cam surface, and means connected to said shaft operable to produce relative movement between said follower and said cam surface and thus cause operation of said gear sector, operation of said gear sector by said cam surface and follower causing rotation of said wiper arm.

5. In a device of the type described, a rotatable shaft, elongated electrical contacting means, a wiper arm in cooperation with said contacting means rotatable about an axis colinear with the axis of said shaft, a cam surface, a pinion on said wiper arm, a gear sector pivotally mounted on an axis parallel to said shaft but spaced therefrom, said gear sector cooperating with said pinion to drive said wiper arm and having a follower cooperating with said cam surface, and means connected to said shaft and operable upon rotation of said shaft to produce relative movement between said follower and said surface.

6. Control apparatus comprising, a rotatable shaft, a current controlling device having a member for varying the current controlling effect thereof, said member being pivotally mounted on an axis substantially coincident with the axis of said shaft, a cam surface, a cam follower pivoted on an axis spaced from the axis of said shaft and in engagement with said cam surface, means mounted on said shaft to produce relative motion between said surface and said follower, and drive means interconnecting said cam follower and said member.

7. A shaft rotatable about a first axis; an elongated resistance member; a wiper arm in engagement with said member and mounted for rotation about an axis substantially colinear with said first axis; a cam surface; motive means mounted for rotation about a second axis parallel to but displaced from the first axis, said motive means including a cam follower cooperating with said cam surface; means connected to said shaft to cause movement between said surface and said follower to normally produce rotation of said motive means; and means connected to said wiper arm in engagement with said motive means so that rotation of said motive means causes rotation of said wiper arm.

8. An elongated resistance element; a wiper mounted for rotation about a first axis cooperating with said element; a drive shaft rotatable about the first axis; means operatively connecting said drive shaft to said wiper so that said wiper may rotate at a different angular speed than said drive shaft, said means comprising a cam surface, a cam follower in engagement with said cam surface, means mounting said cam follower for rotation about a second axis parallel to but displaced from said first axis, means engaging said follower and said wiper so that rotation of said follower about the second axis causes rotation of said wiper about the first axis, and means connected to said shaft causing relative motion of said cam surface with respect to said cam follower to normally produce rotation of said cam follower about the second axis.

9. An elongated resistance element; a wiper cooperating with said resistance element and mounted for rotation about a first axis; driving means connected to said wiper including a first portion mounted for rotation about an axis parallel to but displaced from said first axis and a second portion mounted for rotation about an axis colinear with said first axis; a cam; a cam follower mounted on the first portion of said driving means cooperating with said cam, rotation of the second portion of said driving means causing movement between said cam and said follower to produce rotation of the first portion of said driving means about the second axis and thus produce rotation of said wiper about said first axis.

References Cited in the file of this patent

UNITED STATES PATENTS 2,366,968     Kaufmann _____ Jan. 9, 1945

FOREIGN PATENTS 199,632     Great Britain _____ June 28, 1923